Figure 1:
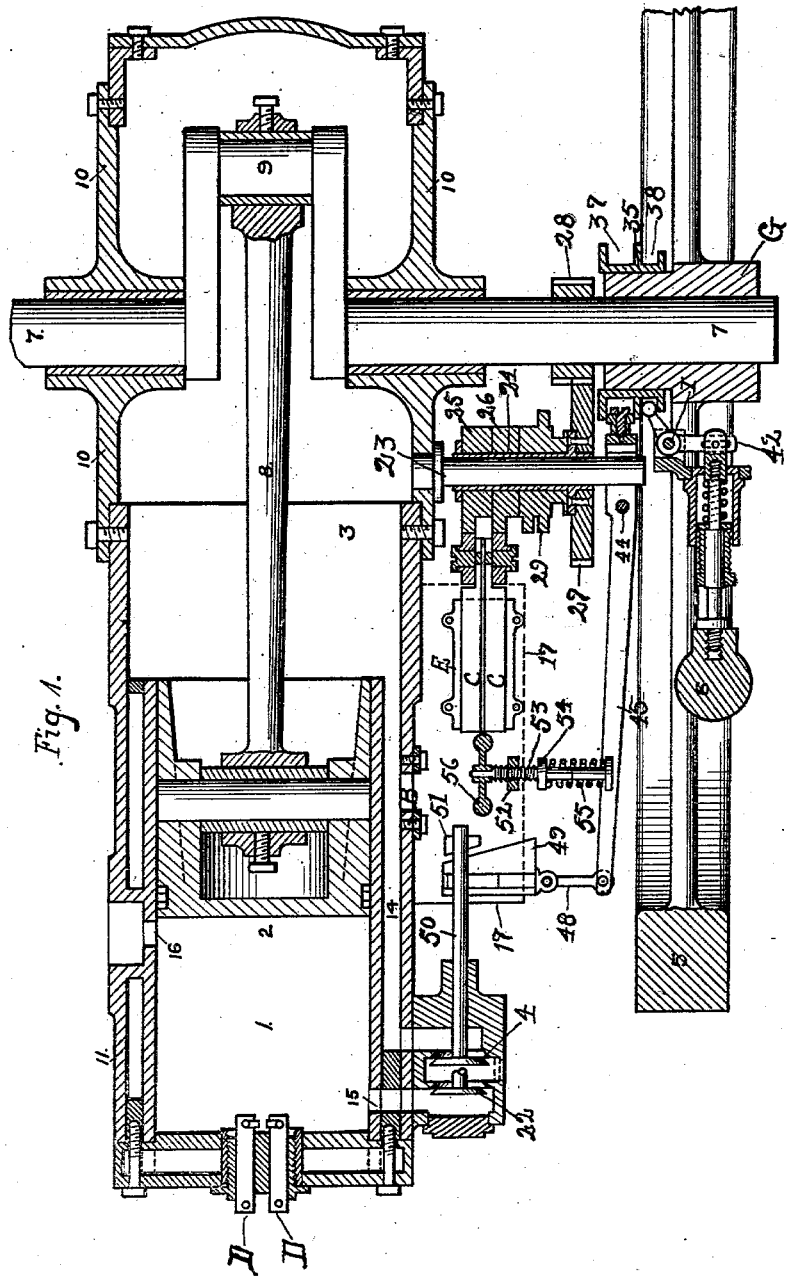

No. 753,483. PATENTED MAR. 1, 1904.
G. W. FULKERSON.
GAS OR GASOLENE ENGINE.
APPLICATION FILED APR. 9, 1903.
NO MODEL. 6 SHEETS—SHEET 1.

WITNESSES:

G. W. FULKERSON,
INVENTOR.

BY
ATTORNEY.

No. 753,483. PATENTED MAR. 1, 1904.
G. W. FULKERSON.
GAS OR GASOLENE ENGINE.
APPLICATION FILED APR. 9, 1903.
NO MODEL. 6 SHEETS—SHEET 2.
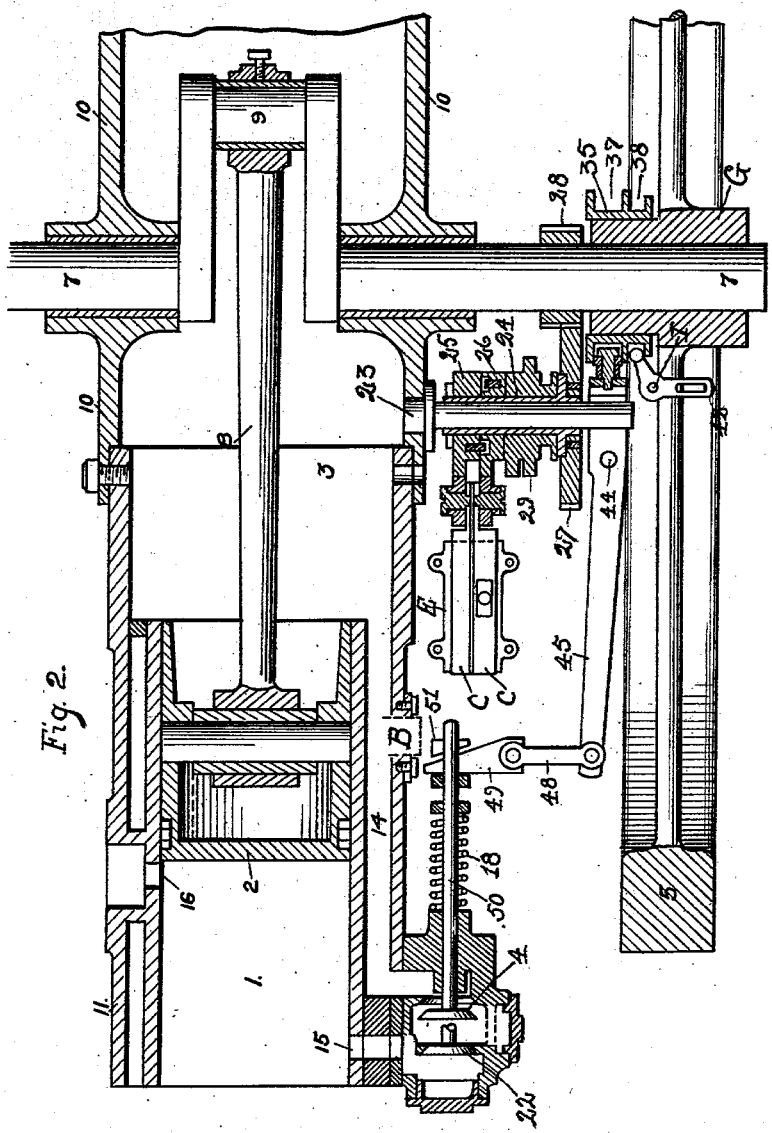
WITNESSES:
Edwin C. Dozier.
Herbert R. Marlatt.
G. W. FULKERSON.
INVENTOR.
BY Robert W. Randle.
ATTORNEY.

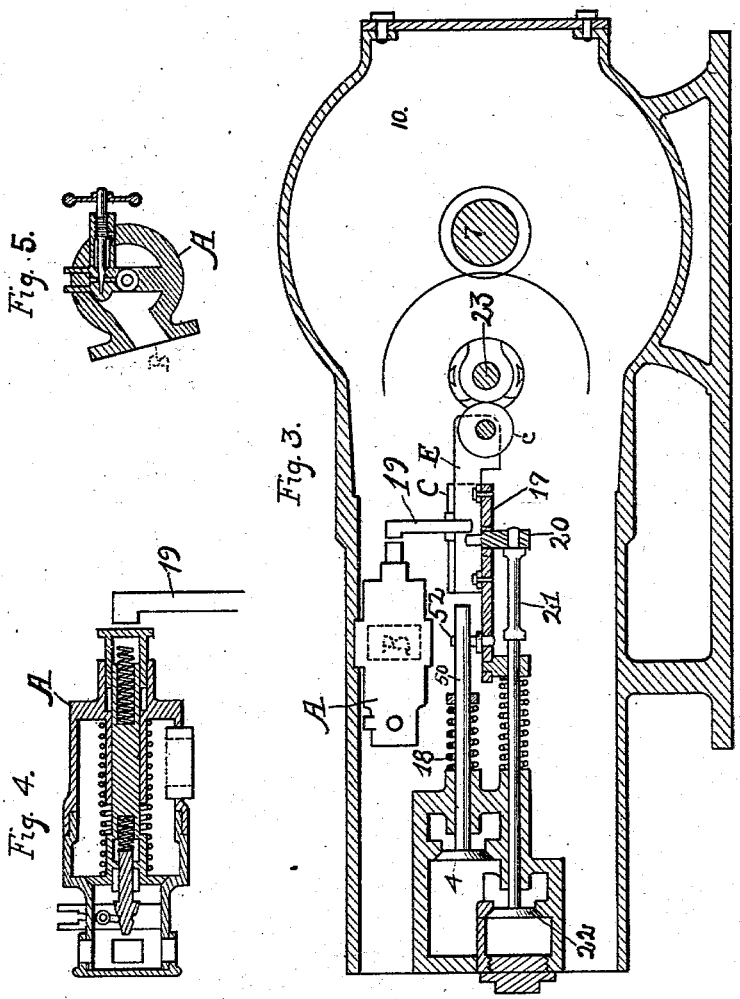

No. 753,483. PATENTED MAR. 1, 1904.
G. W. FULKERSON.
GAS OR GASOLENE ENGINE.
APPLICATION FILED APR. 9, 1903.
NO MODEL. 6 SHEETS—SHEET 4.
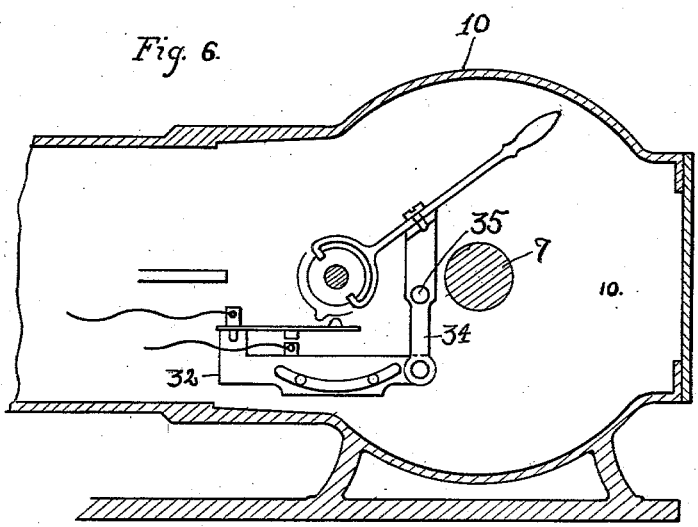
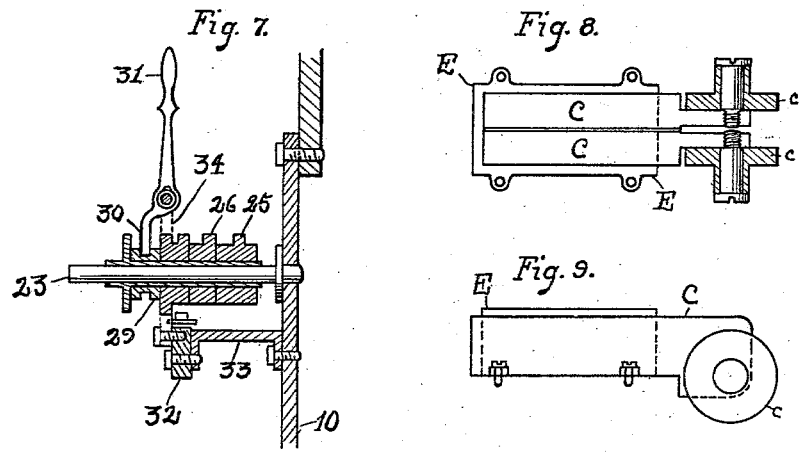
WITNESSES:
Edwin C. Dozier.
Herbert R. Marlatt.
G. W. FULKERSON,
INVENTOR.
BY Robert W. Randle.
ATTORNEY.

No. 753,483. PATENTED MAR. 1, 1904.
G. W. FULKERSON.
GAS OR GASOLENE ENGINE.
APPLICATION FILED APR. 9, 1903.
NO MODEL. 6 SHEETS—SHEET 5.
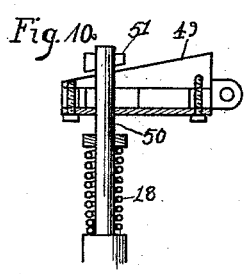
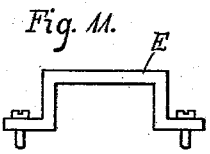
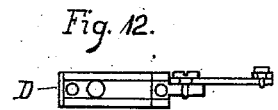
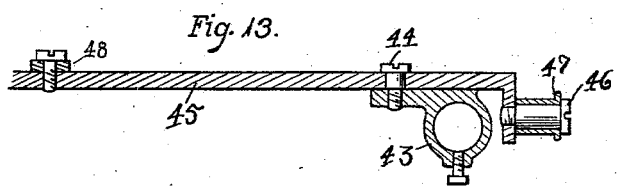
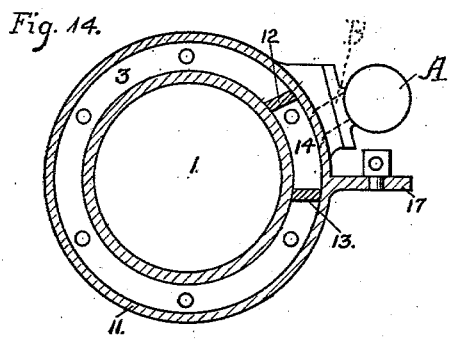
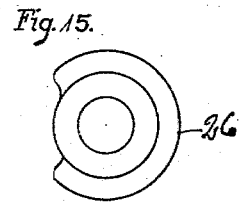
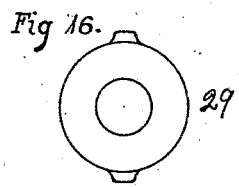
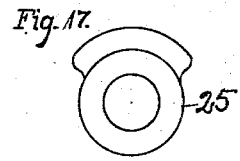
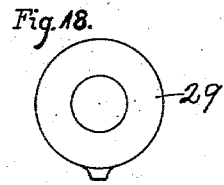
WITNESSES:
Edwin C. Dozier.
Herbert R. Marlatt.
G. W. FULKERSON,
INVENTOR.
BY Robert W. Randle.
ATTORNEY.

No. 753,483. PATENTED MAR. 1, 1904.
G. W. FULKERSON.
GAS OR GASOLENE ENGINE.
APPLICATION FILED APR. 9, 1903.
NO MODEL. 6 SHEETS—SHEET 6.

WITNESSES:
Edwin C. Dozier.
Herbert R. Marlatt.

G. W. FULKERSON,
INVENTOR.
BY Robert W. Randle.
ATTORNEY.

No. 753,483. Patented March 1, 1904.

UNITED STATES PATENT OFFICE.

GEORGE W. FULKERSON, OF HAGERSTOWN, INDIANA.

GAS OR GASOLENE ENGINE.

SPECIFICATION forming part of Letters Patent No. 753,483, dated March 1, 1904.

Application filed April 9, 1903. Serial No. 151,758. (No model.)

*To all whom it may concern:*

Be it known that I, GEORGE W. FULKERSON, a citizen of the United States, residing in Hagerstown, in the county of Wayne, and in the State of Indiana, have invented certain new and useful Improvements in Gas or Gasolene Engines; and I do hereby declare that the following is a full, clear, and exact description of the invention, such as will enable others skilled in the art to which it appertains to make and use the same, when taken in connection with the accompanying drawings, forming a part of this specification.

My invention relates to engines of the internal-combustion type, and particularly to that class of engines using as a prime mover vapors—such as gas, gasolene, coal-oil, or other oil or other vapors, gas, or chemicals—susceptible of combustion or explosion in the cylinder.

The object of my invention, broadly speaking, is the provision of an engine of the type stated adapted to quickly and easily transform the operation thereof from a two to a four and from a four to a two cycle engine at the will of the operator.

Another object of my invention is to secure a greater manageability and economy of working, to abrogate as much as possible the effect of preignition, and to secure greater unanimity of the several elements.

Another object is the provision of a gas or gasolene engine in which wide range and diversity of power and speed is obtained, in which the operator can instantly and while the engine is in operation change the manifest power and speed to other predetermined power or speed, also affording means for reversing the movement of the engine, and also affording easy and ready means for changing the motive power from gas to gasolene, or vice versa, or to other motive power.

Other objects of my invention are to provide improved means of governing and controlling the engine, to provide automatic mechanisms which control the charge to the engine, to simplify the general construction of engines of this type, and to provide an engine which by using the power only when it is needed to properly propel the machinery or load will avoid all waste, and thus reduce the cost of operation.

Another and potent object of my invention is to provide a two-cycle engine—that is, one exploding at every revolution—adapted when desired to be changed into a four-cycle engine—that is to say, one exploding at every other revolution—and convertible from one to the other by the simple movement of a lever, which same lever is adapted to reverse the engine.

Other objects and advantages of my invention will appear from the accompanying drawings and from the following specification.

To these ends the invention consists in the construction, combinations, and arrangements of the several parts of the engine, as otherwhere in this specification are more fully described, and particularly pointed out in the appended claims.

I attain the objects stated by the mechanism illustrated in the accompanying drawings, in which—

Figure 19:
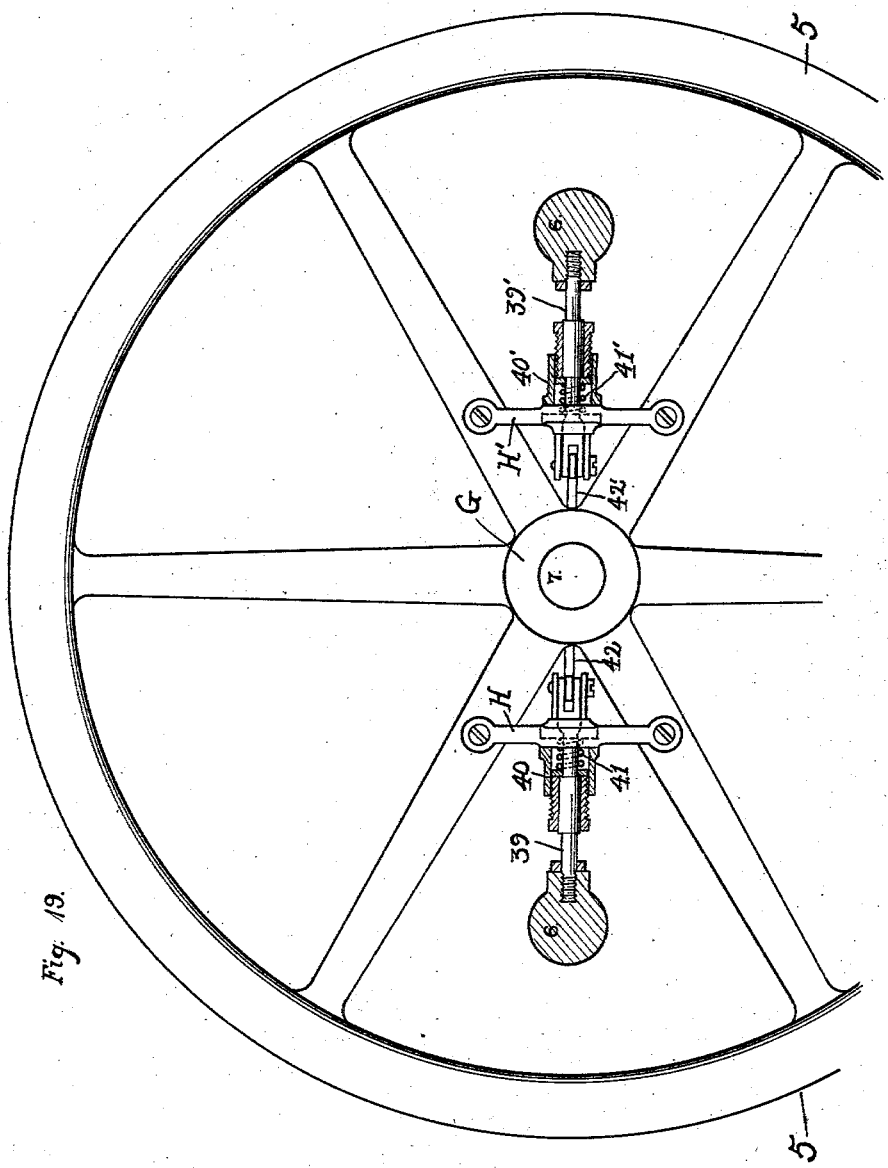

Figure 1 is a horizontal longitudinal central section of my engine on a line with its ports, the piston being shown in the position it assumes on the completion of its stroke. Fig. 2 is a similar view showing the central mechanism only to more clearly illustrate my essential features. Fig. 3 shows an outside elevation of my invention, partly in section, showing the position of the valves and the carbureter. Fig. 4 is a longitudinal section of the carbureter as used. Fig. 5 is a cross-section of same. Fig. 6 is a detail elevation of the crank-chamber, the sparker-key, and the controlling-lever. Fig. 7 is a central cross-section of the same, also showing the cams in section. Fig. 8 is a top plan of the sliding blocks. Fig. 9 is an elevation of same. Fig. 10 is a detail of the essential portions of the device for controlling the charge to the cylinder. Fig. 11 is a detail showing an end view of the casing of the sliding blocks. Fig. 12 is a detail elevation of the sparker. Fig. 13 is a detail showing the arm for operating the mechanism shown in Fig. 10. Fig. 14 is a cross-section through the cylinder of the engine and showing the position of the carbureter. Fig. 15 shows the cam for controlling the carbureter when on the four-cycle movement. Fig. 16 shows the cam for controlling the sparker when on the two-cycle movement. Fig. 17 shows the cam for operating the auxiliary valve when on the four-cycle movement. Fig. 18 shows the cam for controlling the sparker when on the four-cycle movement. Fig. 19 is an elevation of the fly-wheel, also showing the governor in longitudinal central section.

Similar indices refer to and denote like parts throughout the several views.

In the drawings the numeral 1 represents the interior of the cylinder inclosed by a circular wall in the usual manner. 2 is the piston operative in said cylinder.

3 represents the crank-chamber, located tandem of the cylinder 1 and divided therefrom by the piston 2.

4 is the valve controlling the passage-way between the cylinder and the crank-chamber 3. 5 indicates the fly-wheel mounted on the main shaft of the engine. 6 6 are the governor-balls mounted to the arms of the fly-wheel. 7 is the main axle or crank-shaft passing centrally through the said crank-chamber 3 and at right angles to the cylinder 1.

8 is the pitman pivotally connected to the piston-head 2 and also connected to the crank 9 of the crank-shaft 7.

9 is the crank formed in the crank-shaft centrally of the crank-chamber 3, and 10 is the shell of the crank-chamber.

The above-named parts I usually arrange substantially as shown in the drawings.

The wall of the cylinder 1 is surrounded by a water-jacket 11, which forms a space between the cylinder and the jacket for water, substantially as shown in Figs. 1, 2, and 14. Extending longitudinally of the water-space are two bridges or partitions 12 and 13, Fig. 14, which form a channel 14, Figs. 1, 2, and 14, leading from the crank-chamber 3 to the valve 4 and then through the inlet-port 15 into the cylinder 1.

16 represents the exhaust-port of the cylinder.

Extending out horizontally from one side of the jacket 11 is a shelf or bracket 17, to which some of the devices of my engine are secured, as will hereinafter appear.

The shaft 7 extends horizontally through the center of the crank-chamber 10, provided with appropriate bearings in the walls thereof. To one end is secured a pulley or belt wheel (not shown) for transmitting the power developed by the engine to other static machinery, and to the other end of the shaft 7 is secured the fly-wheel 5, carrying the governor which controls other parts hereinafter stated.

It will now be apparent that if the piston 2 be moved back and forth in the cylinder 1 the pitman 8 will revolve the shaft 7, carrying the work-pulley (not shown) and the fly-wheel 5 revolubly in the predetermined direction desired.

The carbureter (shown as a whole in Figs. 4 and 5 and represented by the letter A in Figs. 3 and 14) is secured to the jacket 11 somewhat above the bracket 17, as shown in Fig. 14. The carbureter A, I will not describe in detail, for the reason that the operation of devices of this kind is well known, and any suitable construction thereof may be used herewith. I will state, however, that the flow of gas or vapor to the carbureter is controlled at each required impulse of the piston and also the gas is allowed exit therefrom by means of a cam, and the governor allowing only a third, fourth, or half of the charge in the crank-chamber to enter the cylinder. This being accomplished, the carbureter-valve would act in conjunction with the valve 4 and shut off the load or charge entering the cylinder, the carbureter-valve being automatic in its action. The carbureter referred to may be of any desired type for enriching the gas or for mixing the gas and air in predetermined proportions, or both, although I have shown a specific construction which I have found to give good results in an engine of the herein-described construction.

The igniter may be of any suitable well-known system capable of giving the most satisfactory results and is represented in the drawings by the index D (shown in Figs. 1 and 12) and is located in the center of the cylinder-head.

The motive power for my engine—gas, for instance—is first conducted into the carbureter A, which automatically thoroughly mixes the gas with the predetermined amount of air, and from there the aeriferous gas is conducted into the crank-chamber 3, the inward stroke of the piston serving to draw the gas from the carbureter, and the return or outward stroke of the piston compresses the gas in the crank-chamber and at the same time forces a portion of it through the channel 14 around the inlet-valve 4, through the inlet 15 into the clearance-space of the cylinder 1, where at the proper time it is ignited by the igniter D, and its explosive force is used to propel the piston outward, and after its work has been accomplished it is exhausted through the exhaust-port 16. When the piston is at its extreme outward position, the exhaust-port is opened by the piston at the end of the stroke, as shown in Figs. 1 and 2. A special regulator which I have shown intercepts the supply of gas to the cylinder whenever the velocity becomes too great, which will be explained hereinafter.

Figs. 1 and 2 show the engine on full stroke and the exhaust-port 16 open. Also the inlet-valve 4 is shown open. The valve 4 is held normally seated, closing the passage to the cylinder by the coil-spring 18, as shown in Figs. 2 and 3, the valve 4 being adapted to be operated against the resiliency of the spring 18 by the compressed charge from the crank-chamber forced by the outward thrust of the piston 2, the charge entering the cylinder through the port 15, having previously been drawn from the carbureter through the port B into the passage 14 and then into the chamber 3 and finally back through the channel 14 to the cylinder, as above stated.

Mounted on the bracket 17 is a frame E, in which are carried the laterally-slidable blocks C C, carrying revolubly mounted on their right-hand ends the contact-rollers $c$ $c$. The blocks C C are independent of each other in operation and are adapted to be operated by cams, as will hereinafter appear. Extending up from the outer block C is a finger 19, which finger connects with the stem of the carbureter-valve and may control the entrance of the gas into the crank-chamber. Extending down from the inner block C is a wrist-pin 20, from which extends to the left horizontally the arm 21, and to the extreme left end of the latter is secured the auxiliary valve 22, controlled by said block and its respective cam. The blocks C C are in operation only when the engine is on its four-cycle movement.

Extending out horizontally from the shell 10 of the crank-chamber between the bracket 17 and the shaft 7 and parallel with the latter is a stationary pintle 23, carrying revolubly thereon the collar 24, on which collar is mounted and secured the cams 25 and 26, that are adapted to operate the blocks C C, the cam 25 controlling the valve 22 and the cam 26 controlling the carbureter-valve. The outer end of the sleeve 24 has a flange turned out at right angles to its body portion, to which is secured the gear-wheel 27, which latter meshes with the gear-wheel 28, secured to the shaft 7, by which said collar and cams are revolved by the revolutions of the shaft 7. The auxiliary exhaust-valve 22 opens only when the engine is on the four-cycle movement. When the piston 2 is on its full stroke, the carbureter-valve having been closed by the finger 19, so that no fresh charge of gas could enter the crank-chamber during the inward stroke of the piston, and consequently the cylinder having filled with fresh uncharged air, the valve 22 remains open until the piston returns to the forward end of the cylinder, when it takes its impulse. The carbureter-valve having opened at the commencement of the back stroke, the valve 22 is now closed and the crank-chamber filled with gas from the carbureter. The piston receives no impulse at this point, but moves forward again and compresses the charge in the crank-chamber. The compression opens the valve 4, letting the charge enter the cylinder for impulse on its second forward motion. The cam 29, also mounted on said thimble, has a groove cut around in its periphery, in which operates the tongue 30 of the lever 31, as seen in Fig. 7. The lever 31 is adapted to move the cams on the thimble 24 endwise toward and from the casing 10 to change the operation of the engine to run on the two-cycle movement by disengaging the cams 25 and 26 from the blocks C C and at the same time change the four-cycle sparker-cam and place the two-cycle sparker-cam in place thereof.

The sparker-key 32, Fig. 7, is mounted to the angle-plate 33, which extends out from the casing 10 below the pintle 23. Pivoted at its lower end to the key 32 is a lever 34, pivoted near its center on the stud 35, which extends out from the casing 10. This lever 34 is connected to the lever 31, which enables the operator to reverse the engine at will and to change the movement from a two to a four cycle, and vice versa. Wires extend from the poles of the sparker-key to the poles of the sparker D in the head of the engine.

In Figs. 1 and 2 is shown a slip-sleeve 35, with two parallel channels 37 and 28 in the periphery thereof around the entire face of the sleeve. The sleeve 35 is placed around the inner flange of the hub G, as shown. Extending across between two pairs of the spokes of the fly-wheel 5 are two cross-bars H and H' opposite each other, as shown in Fig. 19, to carry the governors, which consist of the balls 6 6 with shafts 39 and 39' extending therefrom toward the hub G, operating in boxings 40 and 40', carried by said cross-bars H and H'. Said balls 6 6 are held normally inward as near together as possible by the coil-springs 41 and 41'. The inner ends of the shafts 39 and 39' are pivotally connected to the bell-crank 42. The center of the bell-cranks 42 and 42' are pivoted to inwardly-projecting portions of the boxings, as at I in Figs. 1 and 2, and the rondle-points of the bell-cranks are adapted to at all times travel in the channel 38 of the sleeve 36. By this arrangement it is apparent that as the fly-wheel revolves the balls 6 6 will carry out away from each other, and thus carry the sleeve 35 inward on the flange G for the purpose which will presently appear. Secured by a set-screw to the outer end of the pintle 23 is a collar 43, Fig. 13, with a flat upper surface on which is pivoted by a screw or the like 44 the arm 45, the right-hand end of which extends down and from which extends the stud or screw 46. Revolubly mounted on the stud 46 is the thimble 47, forming a roller-contact which is adapted to operate in the channel 37 of the sleeve 36, as shown in Figs. 1 and 2. Thus it will be seen that the left end of the arm 45 will be moved in and out horizontally, controlled by the governor-balls 6 6. Pivoted to the free end of the arm 45 is a link 48, which in turn is pivoted to the wedge-block 49. Extending to the right from the valve 4 is a shaft 50, the outer end portion of which has a longitudinal slot therein to receive the wedge-block 49, and in the right-hand end of said slot is secured a bevel-block 51, whose bevel is the same as the bevel of the block 49 and whose bevels are adapted to contact with each other to move the shaft 50. Thus it will be seen that the range of the valve 4 to open will be limited by the distance the block 49 is inserted in the slot of the shaft 50 and, further, that the position of the block 49 will be determined by the speed of the fly-wheel acting on the governor-balls 6 6, and thereby preventing the valve 4 from opening to its full capacity when the engine is moving rapidly and thereby allowing only a small charge to enter the cylinder. It will thus be seen that this construction will control the speed of the engine without diminishing the number of impulses and assure a more steady and uniform power, such as is impossible to obtain with an engine whose speed is controlled by the number of impulses given.

Secured to and rising from the bracket 17 is a hanger 52, through which is an opening carrying the screw-shaft 53, as shown in Fig. 1. The point of the screw-shaft 53 extends out toward and on a line with the arm 45, and near the center of said screw-shaft is an arbor 54, against which abuts the coil-spring 55, whose outer end is contacted to said arm 45. By this arrangement the operator can turn the screw 53 by means of the hand-wheel 56, secured to the inner end thereof, to cause the spring 55 to press more or less against the arm 45 to keep the block 49 more or less in the slot in the shaft 50, by which the operator is enabled to set the engine for a slower or faster speed, as desired, while the engine is in motion.

As will be noticed, the cam 29 is a three-part integral member containing the two parts, as shown in Figs. 16 and 18, and the groove portion above referred to.

Having now fully shown and described my invention and stated the residual and utilitarian benefits to be derived therefrom, what I claim as new, and desire to secure by Letters Patent of the United States, is—

1. In a gas or gasolene engine the combination, a cylinder, a crank-chamber connected to the cylinder and divided therefrom by a piston operative within the cylinder, a crank-shaft passing through the crank-chamber at right angles to the cylinder, a crank on said shaft in the center of the crank-chamber, a pitman connected to the piston and operative on said crank within the crank-chamber, means for admitting the aerated gas to the crank-chamber on the instroke of the piston, a channel leading from the crank-chamber to the inlet-port of the cylinder, a check-valve located in said channel controlled by the action of governor, means for reversing the engine, and means for changing the action thereof from a two to a four and from a four to a two cycle by the movement of a lever, all substantially as shown and described and for the purposes set forth.

2. In a gas or gasolene engine the combination, a cylinder, a crank-chamber opening into the cylinder and divided therefrom by a piston operative within the cylinder, a shaft passing through the crank-chamber and carried revolubly in the walls thereof, a crank on said shaft in the center of the crank-chamber, a pitman connecting the piston and the crank of the shaft within the crank-chamber, an inlet and exhaust port in the crank-chamber and an inlet and an exhaust port in the cylinder, the channel connecting the exhaust-port of the crank-chamber with the inlet-port of the cylinder, a valve located in said channel controlled by the action of the governor, a sparker located in the cylinder-head and extending into the clearance-space of the cylinder, and means for changing the speed and the cycle of the engine and for reversing the engine, all substantially as shown and described and for the purposes set forth.

3. In a gas or gasolene engine the combination, a cylinder, a crank-shaft connected to the cylinder and divided therefrom by a piston operative within the cylinder, a shaft passing through the crank-chamber and revolubly mounted in the walls thereof, a crank on said shaft in the center of the crank-chamber, a piston connecting the piston and the crank of the shaft, a carbureter located without the crank-chamber with a port leading from the carbureter to the interior of the crank-chamber, a port leading into the clearance-space of the cylinder, a passage-way leading from the crank-chamber to the inlet-port of the cylinder, means for drawing the gas from the carbureter into the crank-chamber by the inward stroke of the piston, means for compressing the gas in the crank-chamber and forcing it through said passage-way into the cylinder by the outward stroke of the piston, a valve located in said passage controlled by the governor and adapted to regulate the entrance of the gas to the cylinder, a sparker located in the clearance-space of the cylinder, means for changing the cycle of the engine and means for reversing the engine at the will of the operator, all substantially as shown and described.

4. In a gas or gasolene engine the combination, a cylinder opening at one end to a crank-chamber and a head closing the opposite end of the cylinder, a sparker located in said head, a piston operative in the cylinder with an outward-projecting pitman pivoted to the piston and connected to the crank of the main shaft, a main shaft passing through the center of the crank-chamber one end of said shaft carrying a fly-wheel and governor carried by the fly-wheel, a bracket extending out from the casing of the cylinder, a carbureter secured to the casing of the cylinder above said bracket with a channel leading therefrom to the interior of the crank-chamber, a channel leading from the interior of the crank-chamber to the clearance-space of the cylinder, means for regulating the passage of gas from the crank-chamber to the cylinder by the action of the governor and means for changing the cycle of the engine and for reversing the engine by the movement of a lever, all substantially as shown and described and for the purposes set forth.

5. In a gas or gasolene engine the combination, a cylinder, a crank-chamber opening into the cylinder and divided therefrom by a piston oscillating within the cylinder on a horizontal plane, a shaft passing through the crank-chamber and carried revolubly in bearings in the walls thereof, a crank on said shaft in the center of the crank-chamber, a pitman connecting the piston and the crank of the shaft within the crank-chamber, an inlet and an exhaust port in the crank-chamber, an inlet and exhaust port in the cylinder, the channel connecting the exhaust-port of the crank-chamber with the inlet-port of the cylinder, a valve located in said channel controlled by the action of the governor, the arm connecting said valve to the governor, a bracket secured to the side of the cylinder-jacket, a hanger extending up from said bracket carrying a horizontal hand-operative screw which carries a coil-spring adapted to engage said arm and adapted to change and vary the speed of the engine, and means for changing the cycle of the engine and for reversing the engine, all substantially as shown and described.

6. In a gas or gasolene engine the combination, a cylinder, a crank-chamber opening into the cylinder and divided therefrom by a piston within the cylinder, a shaft passing through the crank-chamber and carried revolubly in bearings in the walls thereof, a crank formed in the shaft in the center of the crank-chamber, a pitman forming a connecting-rod from the piston to the crank of the shaft, an inlet and an exhaust in the crank-chamber, an inlet and an exhaust port in the cylinder, the channel connecting the exhaust-port of the crank-chamber with the inlet-port of the cylinder, a bracket secured to the side of the jacket of the cylinder, a valve located in said channel controlled by the action of the governor or by a hand-wheel, the connecting-arm attached to the stem of said valve and to the collar of the governor, a standard extending up from said bracket carrying a longitudinal hand-operative screw which carries a coil-spring adapted to engage said arm and adapted to change and vary the speed of the engine, an auxiliary port leading from the clearance-space of the cylinder and controlled by a valve, said valve being operated by cams adapted to change the cycle of the engine, means for varying the speed of the engine, and means for controlling the inlet of gas to the engine from the carbureter by said cams, all substantially as shown and described and for the purposes set forth.

7. In a gas or gasolene engine the combination, of a cylinder and a crank-chamber divided from each other by a piston in the cylinder, a crank-shaft passing through the crank-chamber and adapted to be revolved by a pitman connected to said piston, a fly-wheel secured to said shaft outside the crank-chamber, a pintle extending out parallel with said shaft and some distance therefrom, a sleeve mounted on said pintle, a system of cams mounted on said sleeve and carried thereby, a gear-wheel secured to the outer end of said sleeve, a gear-wheel secured to said main shaft and meshing with said gear-wheel on the sleeve, a channel leading from the crank-chamber to the interior of the cylinder, a valve located in said channel controlled by the governor on the fly-wheel, an auxiliary valve controlled by said cams, a carbureter with an opening leading into said channel and controlled by the action of said cams, and a sparker located in the clearance-space of the cylinder also controlled by said cams, and means for changing the combination of said cams to change the cycle of the engine, all substantially as shown and described and for the purposes set forth.

8. In a gas or gasolene engine the combination, of a cylinder with an explosion-actuated piston therein, a crank-chamber surrounding the crank of the main shaft and a pitman connecting the crank and the piston, a passage leading from the crank-chamber to the clearance-space of the cylinder, a valve operative in said passage controlled by the governor and adapted to be opened by the pressure of gas from the crank-chamber, an auxiliary valve controlled by cams, a lever adapted to change the position of said cams, a carbureter secured to the side of the cylinder-jacket with an opening leading therefrom into the said passage-way and means for controlling the entrance of gas from the carbureter into said passage, a fly-wheel secured to the main shaft, governor carried by the fly-wheel for controlling the speed of the engine, all substantially as shown and described and for the purposes set forth.

9. In a gas or gasolene engine the combination, a cylinder opening at one end into a crank-chamber, a head in the opposite end of the cylinder, a sparker operative in said head, a piston operative in said cylinder and means for operating said piston by explosion, a shaft passing through the crank-chamber operative by the oscillations of the piston, a passage leading from the crank-chamber to the interior of the cylinder, means for varying the capacity of said passage by governor, a system of cams mounted on a pintle extending out from the body of the crank-chamber, the cam-blocks operated by said cams and controlling the action of the carbureter and the sparker, means for supplying aerated compressed gas to the cylinder and of exploding and discharging it therefrom, means for controlling the passage of the gas, means for changing the engaging from a two to a four cycle and from a four to a two cycle engine, means for changing the direction of the revolution, and means for changing the speed all at the will of the operator, all substantially as shown and described and for the purposes set forth.

10. In an explosive engine, the combination of a cylinder and piston, a water-jacket surrounding the cylinder, the passage formed through the space between the cylinder and the jacket longitudinally of the cylinder, a crank-chamber opening into the cylinder, a crank-shaft mounted through the center of the crank-chamber, a pitman connecting the crank of the shaft with the piston, the mechanism comprising a valve operated by the governor adapted to regulate the entrance of gas to the cylinder from the crank-chamber, an exhaust-port in the cylinder controlled by the piston, a carbureter for supplying gas to the crank-chamber and controlled by a cam and a sliding block actuated by a mechanism dependent upon the revolutions of the shaft, substantially as described.

11. The combination of an engine-cylinder and piston therein, an exhaust-valve in the cylinder, an auxillary exhaust-valve operated by a cam and a sliding block, an inlet-valve whose action is controlled by the governor, a sparker operated in the clearance-space of the cylinder and actuated by a cam, a crank-chamber for supplying compressed gas to the cylinder, and a carbureter for supplying gas to the crank-chamber.

12. The combination with a cylinder and a piston therein and means for supplying gas thereto at each or at alternate cycles of the piston, means for exploding the gas in the cylinder and for exhausting the pressure after it has accomplished its work, a crank-chamber connected to the cylinder and means for supplying gas thereto from the carbureter, means for compressing the gas in the crank-chamber by the outward stroke of the piston, governor for regulating the entrance of gas to the cylinder, a hand mechanism for setting the mechanism at a predetermined speed, and a lever operative on the cams and the sparker for changing the cycle of the engine.

In testimony whereof I have hereunto signed my name to this specification in the presence of two subscribing witnesses.

GEORGE W. FULKERSON.

Witnesses:
R. W. RANDLE,
R. E. RANDLE.